(No Model.)
J. J. HOLLAND.
CUT-OFF VALVE GEAR.
No. 332,397. Patented Dec. 15, 1885.
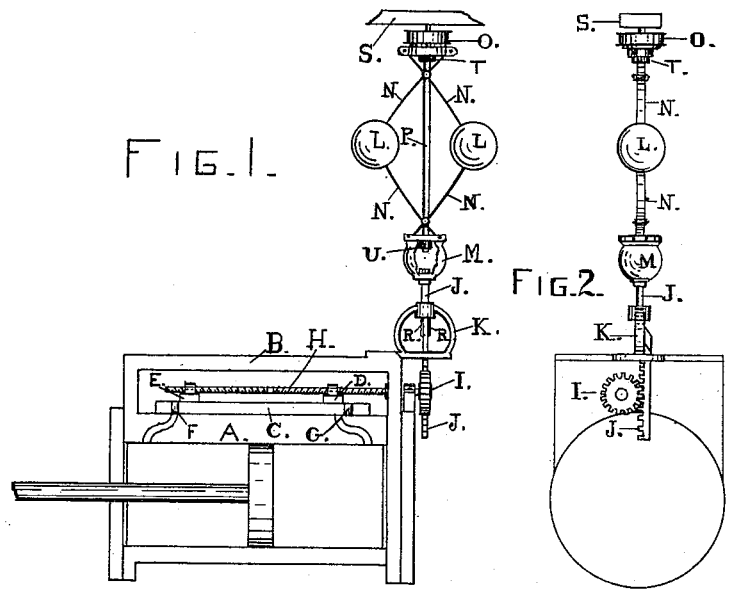
FIG. 1.
FIG. 2.
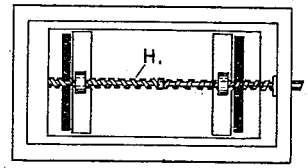
FIG. 3.
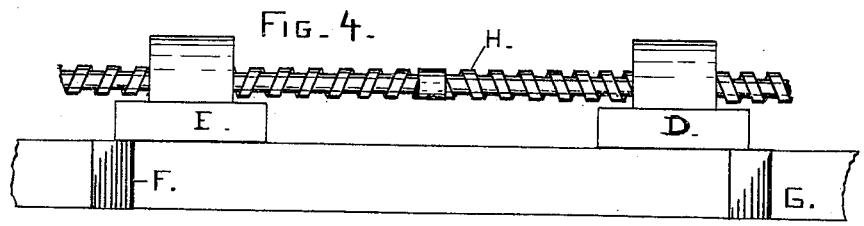
FIG. 4.
ATTEST,
John H. Redstone
L. E. Redstone
INVENTOR,
John J. Holland

UNITED STATES PATENT OFFICE.

JOHN J. HOLLAND, OF SAN FRANCISCO, CALIFORNIA.

CUT-OFF-VALVE GEAR.

SPECIFICATION forming part of Letters Patent No. 332,397, dated December 15, 1885.

Application filed May 20, 1884. Serial No. 132,194. (No model.)

*To all whom it may concern:*

Be it known that I, JOHN J. HOLLAND, a citizen of the United States, residing in the city and county of San Francisco, and State of California, have invented a new and useful Cut-Off-Valve Gear, of which the following is a specification.

My invention relates to improvements in means for operating a cut-off slide-valve for steam-engines. It will be readily understood by reference to the accompanying drawings and the letters marked thereon.

Figure 1 is a sectional elevation showing a steam-cylinder and valve chamber cut longitudinally through the center, with my improved attachment for operating the cut-off valve. Fig. 2 is an end elevation of the same. Fig. 3 is a plan view of the steam-chest with the cover removed, and showing the valve and the cut-off slides; and Fig. 4 is a sectional and broken view of the slide-valve, the cut-off slides, and the operating-screw for operating the cut-off slides.

A represents the cylinder; B, the steam-chest; C, the slide-valve; D and E, the cut-off slides; F and G, the valve-openings; H, the operating-screw for the cut-off slides; I, the spur-wheel that operates the cut-off screw; J, the segmental rack which operates the spur-wheel I to operate the cut-off. This rack J is operated through the guide-frame K by the governor, composed of the guide-rod P, the balls L, the weight and swivel M, the levers N, and the driving-pulley O.

The following is the construction of the same: I construct the screw H, for operating the cut-off slides D and E, with a right-and-left-hand thread, so as to operate the cut-off in an opposite direction, which is a well-known device. I attach the spur-wheel I upon the cut-off screw H. I attach the guide-frame K to serve as a guide for the rack J, which is connected with the weight and swivel M. The swivel M serves as a weight to balance the governor, as well as a swivel to revolve upon the head of the rack J, which has the wings R, to prevent the revolving of the same. The pulley O is attached to the top of the governor, and revolves the same upon the guide-rod P, which is firmly fixed. The top of the governor rests upon the collar T, and the lower part rests upon the collar U when not in operation.

The following is the operation of the same: The speed of the engine being increased, thus increasing the revolutions of the governor, the balls L are thrown out, raising the weight and swivel M, which, as it rises, draws the rod and rack J up, revolving the wheel I and screw H, thus throwing the cut-off slides D and E out, and closing the valve-openings F and G, and correspondingly cutting off the steam, and as the speed of the engine slows down the weight-swivel M returns the balls L to the center and forces down the rack J, revolving the wheel I and screw H, thus uncovering the openings F and G and letting on an increased head of steam, and so on.

I am aware of patent granted to I. W. Bragg for an improvement in governor cut-off-valve gear, No. 277,983, dated May 22, 1883, and also the patent of Thomas Winans, No. 17,712, dated June 30, 1857, and do not seek to claim anything shown or described in either of said patents; but,

Having thus described my invention, what I claim, and desire to secure by Letters Patent, is—

The combination, with the steam-chest having the openings communicating with the cylinder and the slides to close said openings, of the right-and-left screw passing through the slides, the spur-wheel I on the outer end of the screw-rod, the rack J, working in the frame K and meshing with the spur-wheel I, the wings R on the rack J, the weighted swivel M, the rod P, connected with the swivel M, the collar T, the levers N, the balls L, and the pulley O, substantially as set forth.

JOHN J. HOLLAND.

Witnesses:
JOHN H. REDSTONE,
L. E. REDSTONE.